US012179396B2

(12) United States Patent
Walther et al.

(10) Patent No.: US 12,179,396 B2
(45) Date of Patent: Dec. 31, 2024

(54) ARTICLE MADE FROM POST CONSUMER RESIN WITH SMOOTH SURFACE FINISH

(71) Applicant: Dow Global Technologies LLC, Midland, MI (US)

(72) Inventors: Brian W. Walther, Freeport, TX (US); Sachin Laddha, Mumbai (IN)

(73) Assignee: Dow Global Technologies LLC, Midland, MI (US)

( * ) Notice: Subject to any disclaimer, the term of this patent is extended or adjusted under 35 U.S.C. 154(b) by 310 days.

(21) Appl. No.: 17/771,924

(22) PCT Filed: Oct. 23, 2020

(86) PCT No.: PCT/US2020/057074
§ 371 (c)(1),
(2) Date: Apr. 26, 2022

(87) PCT Pub. No.: WO2021/086750
PCT Pub. Date: May 6, 2021

(65) Prior Publication Data
US 2022/0402178 A1 Dec. 22, 2022

(30) Foreign Application Priority Data
Oct. 31, 2019 (IN) .............................. 201941044102

(51) Int. Cl.
*B29C 45/00* (2006.01)
*B29B 17/00* (2006.01)
(Continued)

(52) U.S. Cl.
CPC ...... *B29C 45/0001* (2013.01); *B29B 17/0005* (2013.01); *B29B 17/0042* (2013.01);
(Continued)

(58) Field of Classification Search
CPC ........ B29C 45/0001; B29C 2045/0091; B29B 9/06; B29B 9/12; B29B 17/0005;
(Continued)

(56) References Cited

U.S. PATENT DOCUMENTS

| 3,645,992 A | 2/1972 | Elston |
| 4,076,698 A | 2/1978 | Anderson et al. |

(Continued)

FOREIGN PATENT DOCUMENTS

| CN | 1721178 A | 1/2006 |
| CN | 1858101 A | 11/2006 |

(Continued)

OTHER PUBLICATIONS

Machine translation of JP 2004-307566. (Year: 2004).*
(Continued)

*Primary Examiner* — John D Freeman
(74) *Attorney, Agent, or Firm* — Boyle Fredrickson, S.C.

(57) ABSTRACT

The present disclosure provides a process. In an embodiment, the process includes providing pellets of a regrind material. The regrind material is a post-consumer recycle multilayer film (PCR multilayer film) having at least three layers. The PCR multilayer film is composed of (i) a polyethylene layer, (ii) a polyamide layer, and (iii) a tie layer. The tie layer is composed of maleic anhydride grafted substantially linear ethylene polymer (MAH-g-SLEP) having a Mw/Mn from 1.5 to less than 3.5 and a melt index from 0.5 g/10 min to less than 25 g/10 min. The process includes extruding the pellets to form an extrudate, molding the extrudate, and forming, with the extrudate, a molded article having a surface. The surface of the molded article has a surface roughness value, Sa, less than 1000 nm and a root mean square roughness value, Sq, less than 1400 nm.

7 Claims, 3 Drawing Sheets

(51) Int. Cl.
*C08L 23/06* (2006.01)
*B29B 17/04* (2006.01)
*B29K 77/00* (2006.01)
*B29K 105/00* (2006.01)
*B29K 105/26* (2006.01)

(52) U.S. Cl.
CPC ........... *C08L 23/06* (2013.01); *B29B 17/0412* (2013.01); *B29C 2045/0091* (2013.01); *B29K 2023/06* (2013.01); *B29K 2077/00* (2013.01); *B29K 2105/0088* (2013.01); *B29K 2105/26* (2013.01); *B29K 2995/0073* (2013.01); *C08L 2207/20* (2013.01)

(58) Field of Classification Search
CPC ........... B29B 17/0042; B29B 17/0412; B29B 2017/042; B29B 2017/0476; B29K 2023/0625; B29K 2077/00; B29K 2105/0088; B29K 2105/26; B29K 2995/0073; B29K 2023/06; Y02P 20/143; Y02W 30/52; B29L 2009/00; C08J 2323/06; C08J 2477/00; C08J 11/04; C08L 23/06
See application file for complete search history.

(56) References Cited

U.S. PATENT DOCUMENTS

| | | |
|---|---|---|
| 5,272,236 A | 12/1993 | Lai et al. |
| 5,278,272 A | 1/1994 | Lai et al. |
| 5,346,963 A | 9/1994 | Hughes et al. |
| 5,789,029 A | 8/1998 | Ramsey et al. |
| 6,054,544 A | 4/2000 | Finlayson et al. |
| 6,299,985 B1 | 10/2001 | Zhang et al. |
| 6,335,410 B1 | 1/2002 | Finlayson et al. |
| 6,545,091 B1 | 4/2003 | Lee et al. |
| 6,723,810 B2 | 4/2004 | Finlayson et al. |
| 2007/0218228 A1 | 9/2007 | Kwok et al. |
| 2011/0210469 A1 | 9/2011 | Keller |
| 2013/0096238 A1 | 4/2013 | Alsewailem et al. |
| 2017/0348950 A1* | 12/2017 | Parkinson ............... B32B 27/32 |

FOREIGN PATENT DOCUMENTS

| | | |
|---|---|---|
| CN | 109906144 A | 8/2021 |
| EP | 3040199 B1 | 10/2017 |
| JP | H01-294748 A | 11/1989 |
| JP | 2004-307566 A | 11/2004 |
| JP | 2004-323720 A | 11/2004 |
| WO | 2006/066944 A1 | 6/2006 |
| WO | 2017/021389 A1 | 2/2017 |

OTHER PUBLICATIONS

Compatibilizers: Creating New Opportunity for Mixed Plastics brochure, May 2015, Version 1.0, spi recycling committee, www.plasticsindustry.org/recycle, 6 pages.
Packed with Performance—Enhancing the Value of Barrier Film Recycle Streams with Dow's Compatibilizer Technology, Oct. 2014, vol. 18, Issue 2, 8 pages.
Dow, Enabling Recycling of Flexible Plastic Packaging brochure, Jun. 2016, 2 pages.
CN 202080072137.1 English Explanation of Office Action Related to Search Report.

* cited by examiner

FIG. 1

CS 1 - 15% Orevac 825 in Tie Layer

IE 2 - 15% MAH-g-*SLEP1* in Tie Layer

IE 3 - 25% MAH-g-*SLEP1* in Tie Layer

Sa 3 (nm): 430
Sq 3 (nm): 530

ARTICLE MADE FROM POST CONSUMER RESIN WITH SMOOTH SURFACE FINISH

BACKGROUND

Well known are the environmental hazards caused by plastic waste. Large-scale societal efforts are employed to recycle and re-use plastic materials, commonly known as post consumer resin (PCR). Endeavors to re-process and re-incorporate PCR back into usable consumer articles continue to expand.

However, when molded articles are made from recycled post consumer polymeric material, it has been found that the molded articles have diminished physical properties. Profile extruded articles, in particular, require (1) a smooth surface to enable a uniform surface for sealing and (2) the absence of point defects which tend to decrease abuse performance. Efforts to mold PCR into profile extruded articles with suitable surface smoothness have, thusfar, been deficient.

The art recognizes the need for polymeric compositions that, when recycled, can produce articles having the same or improved physical properties compared to articles produced from virgin polymeric material. A need further exists for polymeric compositions that, when recycled, can produce molded articles with surface smoothness suitable for surface sealing and absent point defects.

SUMMARY

The present disclosure provides a process. In an embodiment, the process includes providing pellets of a regrind material. The regrind material is a post-consumer recycle multilayer film (PCR multilayer film) having at least three layers. The PCR multilayer film is composed of (i) a polyethylene layer, (ii) a polyamide layer, and (iii) a tie layer. The tie layer is composed of maleic anhydride grafted substantially linear ethylene polymer (MAH-g-SLEP) having a Mw/Mn from 1.5 to less than 3.5 and a melt index from 0.5 g/10 min to less than 25 g/10 min. The process includes extruding the pellets to form an extrudate, molding the extrudate, and forming, with the extrudate, a molded article having a surface. The surface of the molded article has a surface roughness value, Sa, less than 1000 nm and a root mean square roughness value, Sq, less than 1400 nm.

The present disclosure provides an article. In an embodiment, a molded article is provided and includes a body composed of an extruded post-consumer recycle multilayer film. The body includes polyethylene, polyamide, and maleic anhydride-grafted substantially linear ethylene polymer. The body has a surface. The surface of the body has a surface roughness value, Sa, less than 1000 nm and a root mean square roughness value, Sq, less than 1400 nm.

BRIEF DESCRIPTION OF THE DRAWINGS

FIG. 1 is a scanning electron micrograph (SEM) of the surface of a film and a Sa-Sq surface roughness model of a comparative film sample.

FIG. 2 is a scanning electron micrograph (SEM) of the surface of a film and a Sa-Sq surface roughness model of inventive example 2 in accordance with an embodiment of the present disclosure.

FIG. 3 is a scanning electron micrograph (SEM) of the surface of a film and a Sa-Sq surface roughness model of inventive example 3 in accordance with an embodiment of the present disclosure.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

High density polyethylene (or "HDPE") is an ethylene homopolymer or an ethylene/α-olefin copolymer with at least one $C_4$-$C_{10}$ α-olefin comonomer, or $C_4$-$C_8$ α-olefin comonomer and a density from 0.940 g/cc, or 0.945 g/cc, or 0.950 g/cc, 0.953 g/cc to 0.955 g/cc, or 0.960 g/cc, or 0.965 g/cc, or 0.970 g/cc, or 0.975 g/cc, or 0.980 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins (available from The Dow Chemical Company), CONTINUUM™ Bimodal Polyethylene Resins (available from The Dow Chemical Company), LUPOLEN™ (available from LyondellBasell), as well as HDPE products from Borealis, Ineos, and ExxonMobil.

"Low density polyethylene" (or "LDPE") consists of ethylene homopolymer, or ethylene/α-olefin copolymer comprising at least one $C_3$-$C_{10}$ α-olefin that has a density from 0.915 g/cc to less than 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer. LLDPE is characterized by little, if any, long chain branching, in contrast to conventional LDPE. LLDPE has a density from 0.910 g/cc to less than 0.940 g/cc. Nonlimiting examples of LLDPE include TUFLIN™ linear low density polyethylene resins (available from The Dow Chemical Company), DOWLEX™ polyethylene resins (available from the Dow Chemical Company), FINGERPRINT' polyethylene resins (available from the Dow Chemical Company), and MARLEX™ polyethylene (available from Chevron Phillips).

An "olefin-based polymer" or "polyolefin" is a polymer that contains a majority amount, or greater than 50 wt %, of polymerized olefin monomer, for example, ethylene or propylene, (based on the weight of the polymer), and optionally, may contain at least one comonomer. A nonlimiting example of an olefin-based polymer is an ethylene-based polymer and propylene-based polymer.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer." Trace amounts of impurities, for example, catalyst residues, may be incorporated into and/or within the polymer. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer. The terms "propylene-based polymer" and "polypropylene" may be used interchangeably.

The term "tie layer," as used herein, is a film layer that serves to adhere two film layers to one another, which layers would otherwise not adhere to one another, or would not adhere to one another with sufficient bond strength.

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer. ULDPE and VLDPE each has a density from 0.885 g/cc to 0.915 g/cc. Nonlimiting examples of ULDPE and VLDPE include ATTANE™ ultra low density polyethylene resins (available from The Dow Chemical Company) and FLEXOMER™ very low density polyethylene resins (available from The Dow Chemical Company).

Test Methods

Density is measured in accordance with ASTM D792, Method B. The result is reported in grams per cubic centimeter (g/cc).

Differential Scanning calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are extrapolated onset of melting, Tm, and extrapolated onset of crystallization, Tc. Heat of fusion ($H_f$) (in Joules per gram), and the calculated % crystallinity for polyethylene samples using the Equation below:

% Crystallinity=(($H_f$)/292 J/g)×100

The heat of fusion ($H_f$) and the peak melting temperature are reported from the second heat curve. Peak crystallization temperature is determined from the cooling curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in Bernhard Wunderlich, *The Basis of Thermal Analysis, in Thermal Characterization of Polymeric Materials* 92, 277-278 (Edith A. Turi ed., 2d ed. 1997).

Crystallization temperature, Tc, is determined from a DSC cooling curve as above except the tangent line is drawn on the high temperature side of the crystallization peak. Where this tangent intersects the baseline is the extrapolated onset of crystallization (Tc).

Glass transition temperature, Tg, is determined from the DSC heating curve where half the sample has gained the liquid heat capacity as described in Bernhard Wunderlich, *The Basis of Thermal Analysis, in Thermal Characterization of Polymeric Materials* 92, 278-279 (Edith A. Turi ed., 2d ed. 1997). Baselines are drawn from below and above the glass transition region and extrapolated through the Tg region. The temperature at which the sample heat capacity is half-way between these baselines is the Tg.

Melt index (MI) (I2) is measured in accordance with ASTM D1238 (190° C./2.16 kg) with results reported in grams per 10 minutes (g/10 min) or decigrams per minute (dg/min). Melt index (I10) is measured in accordance with ASTM D1238 (190° C./10 kg), with results reported in g/10 min. Melt index ratio (I10/I2) is measured in accordance with ASTM D1238 at a temperature of 190° C. taking the ratio of values obtained at 10 kg and 2.16 kg.

Strain at break is measured in accordance with ASTM D638 with results reported in percent (%).

Surface Roughness. Film samples are mounted on double sided tape on an aluminum sample holder in order to ensure the samples is laid flat. The film sample is analyzed with a Keyence VK X 200 Laser Scanning Confocal Microscope using a 50× objective lens (Manufacturers' specifications: Z-resolution=0.5 nm; Spatial Resolution (XY)=120-130 nm; Smallest Detectable Object=8 nm; Beam Spot Diameter with 50× lens=590 nm).

A 3×3 montage is captured area for roughness measurements.

The image is stitched together using a software package within Keyence's VK Analyzer bundle.

A Scanning Probe Image Processor (SPIP) software package, available from Image Metrology A/S Denmark, is used for probe microscopy and optical profilometry analyses.

Once loaded in SPIP software, the tilt in the image was corrected with a $1^{st}$ order polynomial.

A region of interest was defined through an "inspection box" in order to mitigate the influence of stitching artifacts on the outer edges of the image.

"Sa" and "Sq" SPIP classic parameters were calculated using the "roughness and texture analysis" toolbox according to Equation A and Equation B:

$$S_a = \frac{1}{MN} \sum_{k=0}^{M-1} \sum_{i=0}^{N-1} |z(x_k, y_j)| \qquad \text{Equation A}$$

$$S_q = \sqrt{\frac{1}{MN} \sum_{k=0}^{M-1} \sum_{i=0}^{N-1} [(x_k, y_i)]^2} \qquad \text{Equation B}$$

Two dimensional (2D) images were exported after a 200 micrometer scale bar was added.

Three dimensional (3D) images were also exported after adjusting the perspective on each sample to be approximately the same. The 3D images assist in the visualization of the differences in surface roughness.

DETAILED DESCRIPTION

Figure 1:
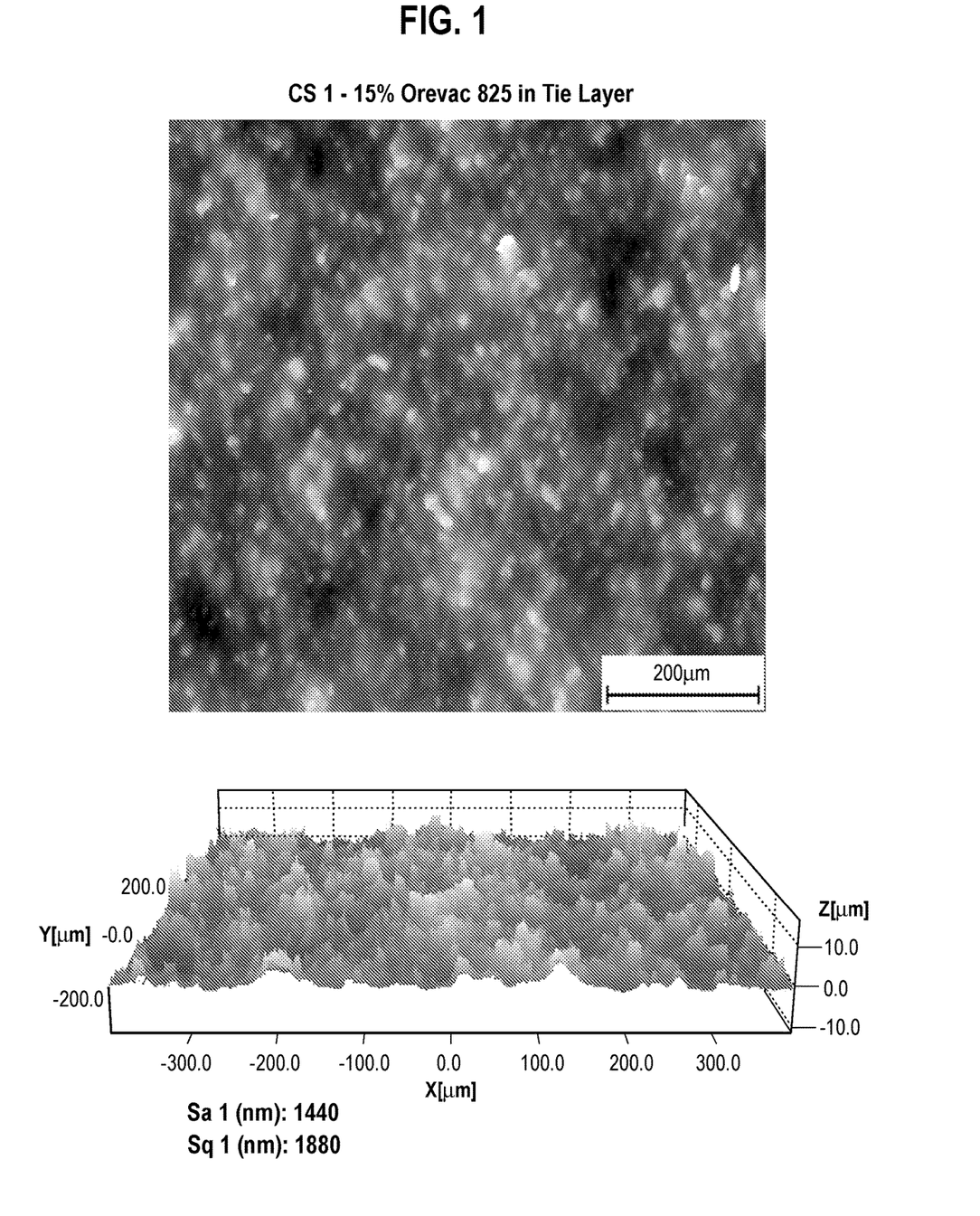
Figure 2:
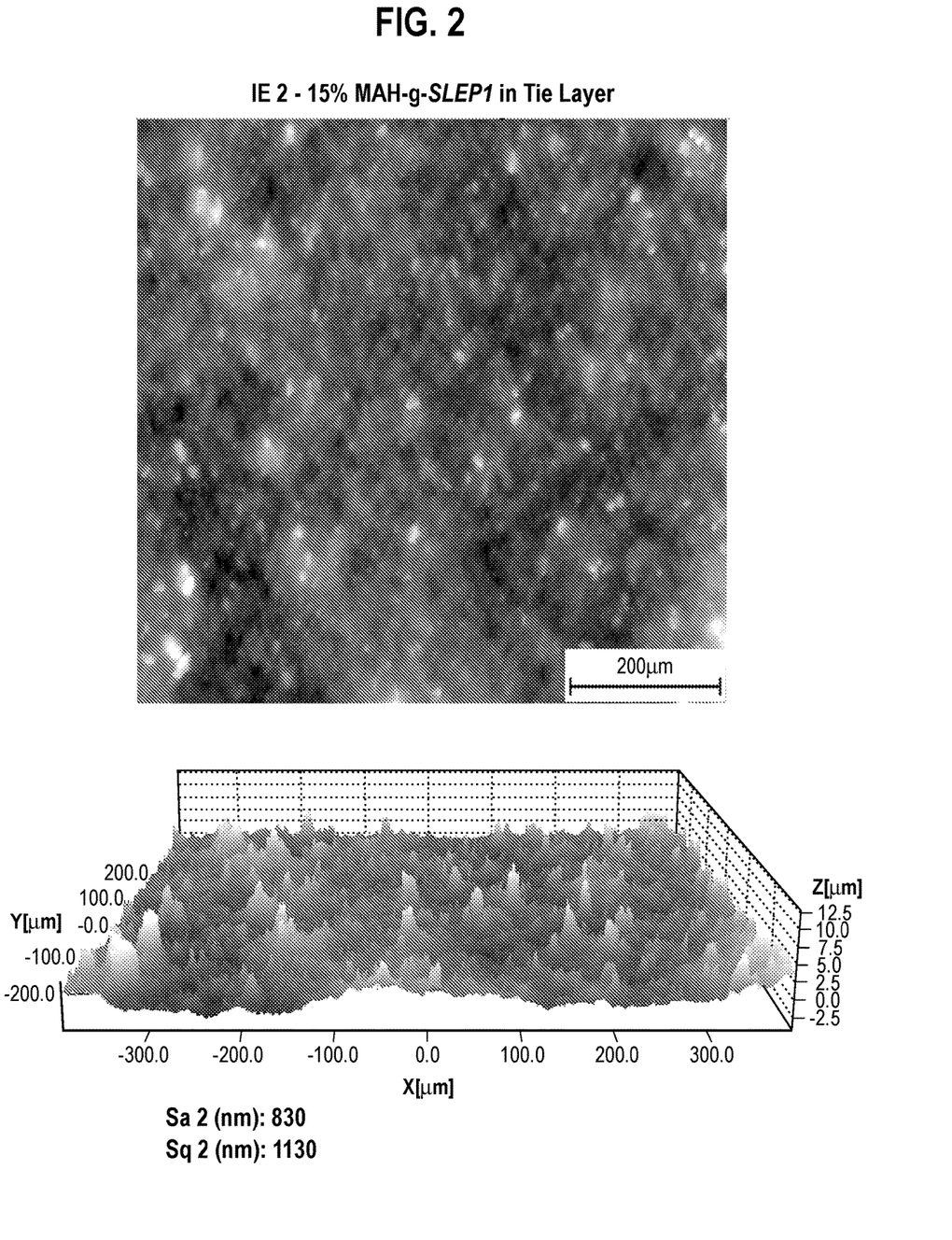
Figure 3:
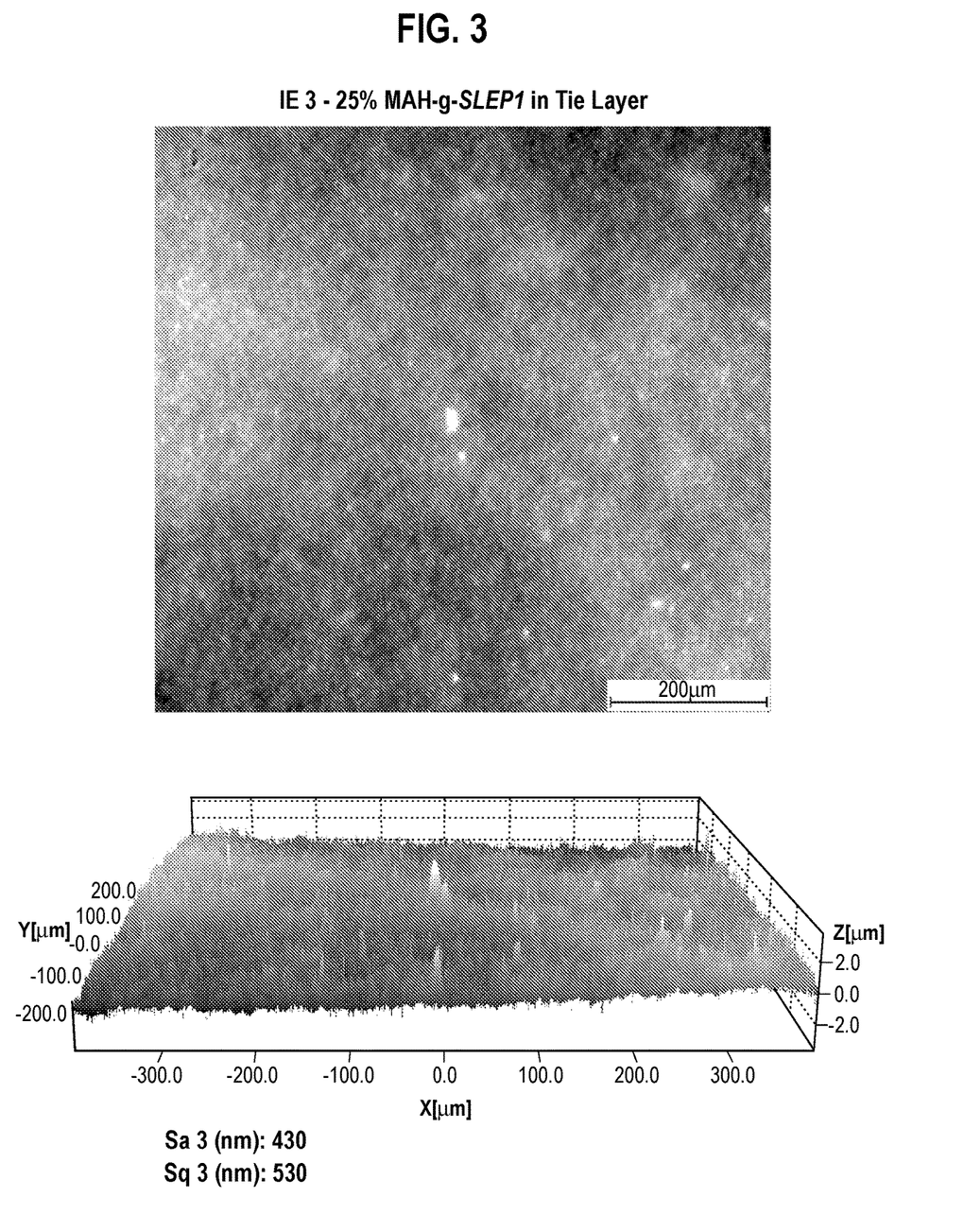

The present disclosure provides a process. In an embodiment, the process includes providing pellets of a regrind material. The regrind material is a post-consumer recycle multilayer film (PCR multilayer film) having at least three layers. The PCR multilayer film is composed of (i) a polyethylene layer, (ii) a polyamide layer, and (iii) a tie layer. The tie layer is composed of maleic anhydride grafted substantially linear ethylene polymer (MAH-g-SLEP) having a Mw/Mn from 1.5 to less than 3.5 and a melt index from 0.5 g/10 min to less than 25 g/10 min. The process includes extruding the pellets to form an extrudate, molding the extrudate, and forming, with the extrudate, a molded article having a surface. The surface of the molded article has a surface roughness value, Sa, less than 1000 nm and a root mean square roughness value, Sq, less than 1400 nm.

The process includes providing pellets of a regrind material. The regrind material is a PCR multilayer film. A "PCR multilayer film," as used herein, is a PCR multilayer film having at least three layers that are (i) a polyethylene layer, (ii) a polyamide layer, and (iii) a tie layer. It is understood PCR includes post industrial recycle (PIR) resin.

The polyethylene layer of the PCR multilayer film is composed of one or more polyethylenes. The polyethylene can be an ethylene homopolymer or an ethylene/α-olefin copolymer. In an embodiment, the ethylene-based polymer is an ethylene/$C_3$-$C_{12}$ α-olefin copolymer. Nonlimiting examples of ethylene/$C_3$-$C_{12}$ α-olefin copolymer include ethylene/propylene copolymer, ethylene/butene copolymer, ethylene/1-hexene copolymer, and ethylene/1-octene copolymer. The ethylene/$C_3$-$C_{12}$ α-olefin copolymer can be a MDPE, LDPE, LLDPE, ULDPE, VLDPE, HDPE, and combinations thereof. In a further embodiment, the ethylene-based polymer is an ethylene/$C_4$-$C_8$ α-olefin copolymer.

A "polyamide," as used herein, is a polymer in which one or more amide linkages of Structure (1) occur along the molecular chain; Structure (1) provided below. Structure (1)

The polyamide layer of the PCR multilayer film is composed of a polyamide having the Structure (1). Nonlimiting examples of suitable polyamide include Nylon 6, Nylon 66, Nylon 11, or Nylon 12, and any combination thereof. In an embodiment, the polyamide has a Tm from 175° C. to less than 270° C., or from 175° C. to less than 230° C.

The tie layer of the PCR multilayer film is composed of a maleic anhydride grafted substantially linear ethylene polymer (MAH-g-SLEP) having a Mw/Mn from 1.5 to less than 3.5 and a melt index from 0.3 g/10 min to less than 25 g/10 min. As used herein, a "substantially linear ethylene and alpha-olefin copolymer" (or "SLEP") is an ethylene-based copolymer in which the comonomer is randomly distributed within a given copolymer molecule, and in which substantially all, or all, of the copolymer molecules have the same ethylene/comonomer ratio within that copolymer. Substantially linear ethylene copolymer is prepared using a constrained geometry catalyst. Examples of constrained geometry catalysts, and such preparations, are also described in U.S. Pat. Nos. 5,272,236 and 5,278,272.

In addition, the substantially linear ethylene copolymer is a homogeneously branched ethylene copolymer having long chain branching. The long chain branches have the same comonomer distribution as the polymer backbone, and can have about the same length as the length of the polymer backbone. "Substantially linear," typically, is in reference to a polymer that is substituted, on average, with 0.01 long chain branches per 1000 total carbons to 3 long chain branches per 1000 total carbons. The length of a long chain branch is longer than the carbon length of a short chain branch formed from the incorporation of one comonomer into the polymer backbone.

In an embodiment, the SLEP is substituted with 0.01 long chain branches per 1000 total carbons to 1 long chain branch per 1000 total carbons, or from 0.05 long chain branches per 1000 total carbons to 1 long chain branch per 1000 total carbons, or from 0.3 long chain branches per 1000 total carbons to 1 long chain branch per 1000 total carbons. Nonlimiting commercial examples of substantially linear polymers include the ENGAGE™ polymers and AFFINITY™ polymers (both available from The Dow Chemical Company).

Substantially linear ethylene copolymer is a unique class of homogeneously branched ethylene polymers. Substantially linear ethylene copolymer is described in U.S. Pat. Nos. 5,272,236; 5,278,272; 6,054,544; 6,335,410; and 6,723,810; the entire contents of each are herein incorporated by reference. SLEP differs substantially from the well-known class of conventional, homogeneously branched linear ethylene polymer, described by Elston in U.S. Pat. No. 3,645,992, and, moreover, they are not in the same class as conventional heterogeneous, "Ziegler-Natta catalyst polymerized" linear ethylene polymers (for example, ultra low density polyethylene (ULDPE), linear low density polyethylene (LLDPE) or high density polyethylene (HDPE) made, for example, using the technique disclosed by Anderson et al. in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

A "maleic anhydride grafted substantially linear ethylene polymer," or "MAH-g-SLEP," as used herein, is a SLEP with from 0.05 wt % to 3 wt % maleic anhydride grafted to the polymer backbone. Weight percent is based on total weight MAH-g-SLEP. The MAH-g-SLEP has one, some, or all of the following properties:

(i) a Mw/Mn from 1.5 to less than 3.5, or from 1.7 to 3.0, or from 2.0 to 2.7; and/or (ii) a melt index from 0.3 g/10 min to less than 25 g/10 min, or from 0.5 g/10 min to 15 g/10 min, or from 1.0 g/10 min to 5 g/10 min, or from 1.5 g/10 min to 3.0 g/10 min; and/or (iii) a density from 0.900 to 0.930 g/cc, or from 0.910 to 0.920 g/cc;

(iii) an I10/I2 from 6 to 10; and/or (iv) from 0.05 long chain branches/1000 carbons to 1 long chain branch/1000 carbons; and/or (v) from 0.05 wt % to 3 wt %, or from 0.5 wt % to 1.5 wt %, or from 0.8 wt % to 1.3 wt % maleic anhydride (based on total weight of the MAH-g-SLEP).

MAH-g-SLEP is disclosed in U.S. Pat. No. 5,346,963 the entire content of which is incorporated herein by reference.

In an embodiment, the PCR multilayer film includes a layer structure whereby the tie layer directly contacts the polyamide layer. The term "directly contacts," as used herein, refers to a layer configuration whereby a first layer is located immediately adjacent to a second layer and no intervening layers or no intervening structures are present between the first layer and the second layer.

In an embodiment, the PCR multilayer film is a five layer film having the layer structure PE/tie/PA/tie/PE wherein "PE" is polyethylene layer, "tie" is tie layer, and "PA" is polyamide layer. The tie layer directly contacts the polyamide layer.

The present process includes providing pellets of a regrind material, the regrind material being the PCR multilayer film. The term "regrind material," as used herein, includes particles of post consumer recycle resin, the post consumer recycle resin being the PCR multilayer film as previously disclosed herein. The term "post consumer recycle resin" (or "PCR") is a polymeric material that has been previously used as consumer packaging or industrial packaging. In other words, PCR is waste plastic. PCR is typically collected from recycling programs and recycling plants. PCR typically requires additional cleaning and processing before it can be re-introduced into a manufacturing line. The PCR is the PCR multilayer film after the PCR multilayer film has completed a first use; i.e. having already served its first purpose. It is understood PCR includes post industrial recycle (PIR) resin. In an embodiment, the PCR multilayer film is waste barrier film that was used to hold, or otherwise to store, consumer-edible oil.

PCR is distinct from virgin polymeric material. Since PCR has gone through an initial heat and molding process; PCR is not "virgin" polymeric material. A "virgin polymeric material" is a polymeric material that has not undergone, or otherwise has not been subject to, a heat process or a molding process. The physical, chemical and flow properties PCR resin differ when compared to virgin polymeric resin.

In an embodiment, the process includes flaking the PCR multilayer film to form flakes of the PCR multilayer film. The process further includes densifying the flakes to form the pellets of the regrind material.

In an embodiment, a film containing MAH-g-SLEP is introduced into a grinder equipped with cutting blades capable of converting the film into individual flakes of nominally less than 3.0 centimeters in diagonal length. These flakes are transferred and metered via any number of conventional systems into the feed zone of a extruder. The extruder is designed to densify and melt the flakes to form a molten pool of polymer. This pool of polymer is pressurized and pushed out of the extruder through a die where the polymer may be converted into a solid pellet. The pellets are collected and any contact water from the process is removed. Optimizations of the densification process would include the use of a device to aid in pushing the flakes into the feed zone of an extruder. Some extruders are designed with a vent port to allow any moisture or volatiles that are in the polymer stream to escape. Converting the molten polymer into a pellet may be achieved by either chopping strands of the polymer or by the use of an underwater pelletizing unit. In all cases the pellets should be solid without voids.

In a further embodiment the initial film can sourced from a roll of trim scrap produced during the initial film production or from the film after it is used for its intended purpose.

The process includes extruding the pellets of the regrind material (e.g., pellets of the PCR multilayer film) to form an extrudate. The term "extruding," or "extrusion" is a process in which a polymer is introduced into an extruder and the polymer is propelled continuously along a screw through regions of high temperature and pressure where the polymer is melted and compacted, and finally forced through a die. The extruder may be a single screw extruder, a multiple screw extruder, a disk extruder or a ram extruder.

The process includes molding the extrudate (formed from the melted pellets of regrind material) into an article. The term "molding," or "molded," as used herein, is a process wherein a polymer is melted and formed into an extrudate, the extrudate then is led into a mold, the mold being the inverse of a desired shape, to form an article (or a part) of a desired shape and size. Molding can be pressure-less or pressure-assisted.

The process includes forming a molded article having a surface. The surface has a surface roughness value, Sa, less than 1000 nm and a root mean square roughness value, Sq, less than 1400 nm.

In an embodiment, the process includes profile molding the extrudate (formed from the melted pellets of the regrind material) and forming a profile article. The term "profile molding," as used herein, is a process in which a polymeric material is melted and formed into an extrudate, and the extrudate is subsequently propelled through an extrusion die whereby the extrudate takes the shape of the extrusion die, resulting in a "profile." Upon exiting the extrusion die, the profile is given its final shape and cooled simultaneously. The cooled profile is cut, thereby forming "a profile article."

The profile article has a continuous cross section such as pipe, decorative molding, and automotive exterior trim. Profile molding is advantageous for producing continuous uniform thermoplastic items having complex cross sections. Nonlimiting examples of profile article include wire and cable jackets, flexible tubing, weather stripping, plastic lumber, and decorative molding.

In an embodiment, the profile article has a thickness greater than 0.254 millimeters (10 mils). The thickness of 0.254 millimeters (10 mils) is typically considered the uppermost thickness for an extruded film. In other words, the profile article with a thickness greater than 0.254 millimeters is not a film and excludes extruded films.

In an embodiment, the process includes injection molding the extrudate (formed from the melted pellets of the regrind material) and forming an injection molded article. The term "injection molding," as used herein is a process by which a polymer material is melted and injected at high pressure into a mold, the mold being the inverse of the desired shape, to form an article of the desired shape and size. The mold can be made from metal, such as steel and aluminum.

In an embodiment, the process includes blow molding the extrudate (formed from the melted pellets of the regrind material) and forming a blow molded article. The term "blow molding," as used herein, is a process that includes placing an extrudate in the center of a mold, inflating the polymer against the mold walls with a blow pin, and solidifying the product by cooling. Blow molding can be used for making hollow plastics containers.

In an embodiment, the process includes providing pellets of the regrind material having from (i) 82 wt % to 89.5 wt % polyethylene, from 10 wt % to 15 wt % polyamide, and from 0.5 wt % to 3.0 wt % MAH-g-SLEP. The process includes injection molding the extrudate; and forming an injection molded article having a surface. The surface has an Sa value from 400 nm to 900 nm and an Sq value from 500 nm to 1200 nm.

In an embodiment, the process includes blending from 1 wt % to 70 wt % of the pellets of the regrind material with from 99 wt % to 30 wt % of a virgin polyethylene. The process includes extruding the pellets and the virgin polyethylene to form an extrudate of the blend and molding the extrudate; and forming a molded article. The molded article has a surface. The surface has a surface roughness value, Sa, less than 1000 nm and a root mean square roughness value, Sq, less than 1400 nm.

The present disclosure provides a molded article. In an embodiment, the molded article includes a body composed of an extruded post-consumer recycle multilayer film. The body is composed of (i) polyethylene, (ii) polyamide, (iii) maleic anhydride-grafted substantially linear ethylene polymer. The body has a surface. The surface has a surface roughness value, Sa, less than 1000 nm and a root mean square roughness value, Sq, less than 1400 nm.

In an embodiment, the body of the molded article is formed from extruded post-consumer recycle multilayer film and is composed of (i) from 82 wt % to 89.5 wt % polyethylene;
(ii) from 10 wt % to 15 wt % polyamide; and
(iii) from 0.5 wt % to 3.0 wt % maleic anhydride grafted substantially linear ethylene polymer MAH-g-SLEP. The body has a surface. The surface has a surface roughness value, Sa, from 400 nm to 900 nm and an Sq value from 500 nm to 1200 nm.

By way of example, and not limitation, some embodiments of the present disclosure will now be described in detail in the following Examples.

EXAMPLES

Table 1 below provides a list of the materials used in the Examples.

TABLE 1

| Materials | | |
|---|---|---|
| Resin | Properties | Source |
| LLDPE ethylene/octene copolymer ELITE 5401G | I2-10 g/10 min d-0.918 g/cc | Dow Inc. |

TABLE 1-continued

| Materials | | |
|---|---|---|
| Resin | Properties | Source |
| LLDPE ethylene/octene copolymer ELITE 5400G | I2-1.0 g/10 min d-0.916 g/cc | Dow Inc. |
| MAH-g-SLEP Maleic anhydride grafted substantiallylinear ethylene/octene copolymer (MAH-g-SLEP1) | I2-3.0 g/10 min d-0.912 g/cc Mw/Mn-2.7 MAH-1.1 wt % | Dow Inc. |
| Maleic anhydride grafted LLDPE (Ziegler-Nattacatalyzed, heterogeneous copolymer) (OREVAC 825) | I2-3.0 g/10 min d-0.913 g/cc MAH-0.9 wt % Vicat 99° C. @ 10N | Orevac 825, Arkema |
| Polyamide Nylon 6 Nylon B33L | I2 2.19-3.41 g/10 min d 1.12-1.15 g/cc | BASF |
| LLDPE Ethylene/butene copolymer CEFOR 1211P | I2-1.0 g/10 min d-0.918 g/cc | Dow Inc. |
| Non-slip LDPE LDPE 310E | I2-0.75 g/10 min d-0.916 g/cc | Dow Inc. |
| Slip LDPE LDPE 312E | I2-0.75 g/10 min d-0.918 g/cc | Dow Inc. | d = density (g/cc),
I2 = melt index (g/10 min), wt % based on total weight of MAH grafted polyethylene

A. Multi-Layer Film Fabrication

Three five-layer coextruded films are fabricated on a Tab Tech 5 layer extruder where the layer thicknesses are controlled via the output of the individual extruders tied to the 5 layers. All of the extruders used a linear zone temperature profile starting at 100° C. and advancing to 325° C. at the die. The die was temperature controlled to 325° C. Each multilayer film has the following layer structure: PE/tie/PA/tie/PE. The material composition for the polyethylene layer (PE seal layer), polyamide layer (PA barrier layer), and the second polyethylene layer (PE outer layer) for each of the three films is held constant. The material composition of the tie layer is varied to evaluate recycle performance. Tie layer compositions evaluated include Orevac 825 and MAH-g-SLEP1. Table 2 below provides the structure/composition of PE/tie/PA/tie/PE five-layer films having a thickness of 72 µm.

TABLE 2

| | Vol % | Film 1 | Film 2 | Film 3 |
|---|---|---|---|---|
| Polyethylene layer (seal layer) Inner | | 80% ELITE 5401G + 20% LDPE 312E | 80% ELITE 5401G + 20% LDPE 312E | 80% ELITE 5401G + 20% LDPE 312E |
| Tie layer | 7.5 | 15% OREVAC 825 + 85% CEFOR 1211P | 15% MAH-g-SLEP1 + 85% CEFOR 1211P | 25% MAH-g-SLEP1 + 75% CEFOR 1211P |
| Polyamide layer (barrier layer) | | Nylon B33L | Nylon B33L | Nylon B33L |
| Tie | 7.5 | 15% OREVAC 825 + 85% CEFOR 1211P | 15% MAH-g-SLEP1 + 85% CEFOR 1211P | 25% MAH-g-SLEP1 + 75% CEFOR 1211P |
| Polyethylene layer (outer layer) | | 80% ELITE 5400G + 20% LDPE 310E | 80% ELITE 5400G + 20% LDPE 310E | 80% ELITE 5400G + 20% LDPE 310E |
| Corresponding % of tie resin in entire film formulation | 15% | 2.14% OREVAC 825 | 2.14% MAH-g-SLEP1 | 3.5% MAH-g-SLEP1 |

B. Granulation of Multi-Layer Film

Each multilayer film from Table 2 above was ground into granular form. The granules have an average size 30 pellets per 1 gram. Each multilayer film from Table 2 was fed into a high speed cutter thereby flaking the multilayer film and converting the multilayer film into a fluffy material of flakes. The fluffy material of flakes was fed into a twin screw extruder, densifying the flakes to form pellets of PCR multilayer film. The pellets have a length of 3-4 mm size (longest dimension).

The pellets of PCR regrind material are fed into an Arburg machine (at 220° C.) to produce extrusion injection molded plaques 10 mm, x 10 mm×2 mm thickness in size.

Each plaque was mounted on double sided tape on an aluminum sample holder in order to ensure the samples is laid flat. Each sample is analyzed with a Keyence VK X 200 Laser Scanning Confocal Microscope using a 50× objective lens (Manufacturers specs: Z-resolution=0.5 nm; Spatial Resolution (XY)=120-130 nm; Smallest Detectable Object=8 nm; Beam Spot Diameter with 50× lens=590 nm).

A 3×3 mm montage image is captured in order to provide an area suitable for surface roughness measurements. The image is stitched together using a software package within Keyence's VK Analyzer bundle. The SPIP software package is used for probe microscopy and optical profilometry analysis. Once loaded in SPIP software, the tilt in the image was corrected with a $1^{st}$ order polynomial. A region of interest was defined through an "inspection box" in order to mitigate the influence of stitching artifacts on the outer edges of the image. 2D images were exported after a 200 micrometer scale bar was added. 3D images were also exported after adjusting the perspective on each sample to be approximately the same. The 3D images assist in the visualization of the differences in surface roughness.

Table 3 below provides surface roughness values, Sa and Sq, for plaques formed from the regrind of Film 1, Film 2, and Film 3 from Table 2.

CS1 in Table 3 has Sq value of 1830 compared to respective IE2 and IE3 Sq values of 1103 nm and 530 nm.

At similar levels of Orevac 825 (CS1-2.14 wt %, Ziegler-Natta catalyzed MAH-g-polymer) vs MAH-g-SLEP1 (IE2-2.14 wt % MAH-g-SLEP1), regrind PCR resin with MAH-g-SLEP1 exhibits smoother surface finish: CS1 Sa/Sq 1440/

TABLE 3 surface roughness for plaques of PCR multilayer film

| PCR | Film Structure by Layer composition of PCR film* | Layer thickness (um) | Volume % of film | Amount of MAH-g-PE in PCR+ | Amount of PA in PCR+ | MAH-g-PE/ PA | Sa of injection molded plaque, nm | Sq of injection molded plaque, nm |
|---|---|---|---|---|---|---|---|---|
| CS1 | PE layer (seal) 80% Elite 5401G + 20% LDPE 312E | 28 | 38.9 | | | | | |
| | Tie layer 15% Orevac 825 + 85% 1MI CEFOR 1211P LLDPE | 4 | 5.6 | 0.83 | | | | |
| | PA layer (barrier)- 100% Nylon B33L | 8 | 11.1 | | 12.7 | | | |
| | Tie layer 15% Orevac 825 + 85% 1MI CEFOR 1211P LLDPE | 4 | 5.6 | 0.83 | | | | |
| | PE layer (outer) 80% Elite 5400G + 20% LDPE 310E | 28 | 38.9 | | | | | |
| | Total | | | 1.67 | 12.7 | 0.13 | 1440 | 1880 |
| IE2 | PE layer (seal) 80% Elite 5401G + 20% LDPE 312E | 28 | 38.9 | | | | | |
| | Tie layer 15% MAH-g-SLEP1 + 85% 1MI CEFOR 1211P | 4 | 5.6 | 0.83 | | | | |
| | PA layer (barrier) 100% Nylon B33L | 8 | 11.1 | | 12.7 | | | |
| | Tie layer 15% MAH-g-SLEPI + 85% 1MI CEFOR 1211P | 4 | 5.6 | 0.83 | | | | |
| | PE layer (outer) 80% Elite 5400G + 20% LDPE 310E | 28 | 38.9 | | | | | |
| | Total | | | 1.67 | 12.7 | 0.13 | 830 | 1130 |
| | Improvement over CS1 | | | | | | 42% | 40% |
| IE3 | PE layer (seal) 80% Elite 5401G + 20% LDPE 312E | 28 | 38.9 | | | | | |
| | Tie layer 25% MAH-g-SLEP1 + 75% 1MI CEFOR 1211P | 4 | 5.6 | 1.39 | | | | |
| | PA layer (barrier) 100% Nylon B33L | 8 | 11.1 | | 12.7 | | | |
| | Tie layer MAH-g-SLEP1 + 75% 1MI C4 LLDPE | 4 | 5.6 | 1.39 | | | | |
| | PE layer (outer) 80% Elite 5400G + 20% LDPE 310E | 28 | 38.9 | | | | | |
| | Total | | | 2.78 | 12.7 | 0.22 | 430 | 530 |
| | Improvement over CS1 | | | | | | 70% | 72% |

*wt % based on total weight of film layer, +wt % based on total weight PCR material CS = comparative sample, IE = inventive example Table 3 shows that plaques IE2 and IE3 formed from regrind material with tie layer containing MAH-g-SLEP1 exhibit improved surface smoothness compared to plaque CS1 formed from regrind material with tie layer that is Ziegler-Natta catalyzed polymer with MAH graft (Orevac 825). CS1 in Table 3 has Sa value of 1440 nm compared to respective IE2 and IE3 Sa values of 830 nm and 430 nm.

1880 nm and IE2 Sa/Sq 830/1130 nm. As the amount of MAH-g-SLEP1 increases (IE3-3.5 wt % MAH-g-SLEP1), the surface gets even smoother: IE3 Sa/Sq 430/530 nm.

It is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. A process comprising:
providing pellets of a regrind material, the regrind material being a post-consumer recycle multilayer film (PCR multilayer film) having at least three layers of (i) a polyethylene layer, (ii) a polyamide layer, and (iii) a tie layer, the tie layer composed of maleic anhydride grafted substantially linear ethylene polymer (MAH-g-SLEP) having a Mw/Mn from 1.5 to less than 3.5 and a melt index from 0.3 g/10 min to less than 25 g/10 min as measured in accordance with ASTM D1238 (190° C./2.16 kg), the regrind material comprising
from 82 wt % to 89.5 wt % polyethylene,
from 10 wt % to 15 wt % polyamide, and
from 0.5 wt % to 3.0 wt % MAH-g-SLEP;
extruding the pellets to form an extrudate;
molding the extrudate; and
forming, with the extrudate, a molded article having a surface, the surface having a surface roughness value, Sa, less than 1000 nm and a root mean square roughness value, Sq, less than 1400 nm.

2. The process of claim 1 comprising
flaking, before the providing, the PCR multilayer film to form flakes of the PCR multilayer film; and
densifying the flakes to form the pellets of the regrind material.

3. The process of claim 1 wherein
the molding step comprises injection molding the extrudate; and
the forming step comprises forming an injection molded article having a surface, the surface having an Sa value from 400 nm to 900 nm and an Sq value from 500 nm to 1200 nm.

4. The process of claim 1 comprising
blending from 1 wt % to 70 wt % of the pellets of the regrind material with
from 99 wt % to 30 wt % of a virgin polyethylene;
extruding the pellets and the virgin polyethylene to form an extrudate of the blend;
molding the extrudate of the blend; and
forming a molded article.

5. The process of claim 1 wherein the extruding comprises
melting, in an extruder, the pellets of the regrind material; and
forcing the melted regrind material through a die.

6. A molded article comprising:
a body composed of an extruded post-consumer recycle multilayer film, the body comprising
polyethylene;
polyamide; and
maleic anhydride-grafted substantially linear ethylene polymer having a Mw/Mn from 1.5 to less than 3.5 and a melt index from 0.3 g/10 min to less than 25 g/10 min as measured in accordance with ASTM D1238 (190° C./2.16 kg);
the body having a surface, the surface having a surface roughness value, Sa, less than 1000 nm and a root mean square roughness value, Sq, less than 1400 nm.

7. The molded article of claim 6 wherein the body comprises
from 82 wt % to 89.5 wt % polyethylene;
from 10 wt % to 15 wt % polyamide; and
from 0.5 wt % to 3.0 wt % maleic anhydride grafted substantially linear ethylene polymer MAH-g-SLEP;
the body having a surface, the surface having a surface roughness value, Sa, from 400 nm to 900 nm and a root mean square roughness value, Sq, from 500 nm to 1200 nm.

* * * * *